United States Patent [19]

Methlie

[11] 4,153,141
[45] May 8, 1979

[54] AUXILIARY OIL SUPPLY SYSTEM

[75] Inventor: Jan E. Methlie, West Chester, Ohio

[73] Assignee: General Electric Company, Cincinnati, Ohio

[21] Appl. No.: 808,209

[22] Filed: Jun. 20, 1977

[51] Int. Cl.² .............................................. F01M 11/12
[52] U.S. Cl. .................................... 184/6.2; 184/6.4; 184/6.11; 60/39.08
[58] Field of Search ................... 184/6.2, 6.11, 6.4, 184/7 R; 60/39.08; 123/196 S, 196 R

[56] References Cited

U.S. PATENT DOCUMENTS

| | | | |
|---|---|---|---|
| 1,674,103 | 6/1928 | Frederick | 184/6.2 |
| 1,866,280 | 7/1932 | Woolson | 184/6.2 |
| 1,997,700 | 4/1935 | Short | 184/6.4 |
| 2,239,098 | 4/1941 | Hunter | 184/6.2 X |
| 2,332,007 | 10/1943 | Parker | 184/6.2 X |
| 2,913,069 | 11/1959 | Kubis | 184/6.2 |
| 3,554,322 | 1/1971 | Deutschmann et al. | 184/6.2 |
| 3,779,345 | 12/1973 | Barnes | 184/6.4 |
| 3,857,461 | 12/1974 | Schmitt | 184/6.2 |

FOREIGN PATENT DOCUMENTS

| | | | |
|---|---|---|---|
| 702551 | 1/1965 | Canada | 184/6.11 |
| 708099 | 4/1954 | United Kingdom | 184/6.2 |
| 443193 | 5/1966 | U.S.S.R. | 184/6.11 |

Primary Examiner—David H. Brown
Attorney, Agent, or Firm—Dana F. Bigelow; Derek P. Lawrence

[57] ABSTRACT

In a lubrication system where the main oil supply to rotating components is susceptible to interrupted flow, an auxiliary system is implemented to temporarily meet the emergency lubrication needs. Provision is made by an auxiliary line to supply the components with a flow of lubricant from the existing hydraulic tank which is kept full and under pressure. This emergency flow is initiated by the opening of a valve in the auxiliary line and, on the other side of the components to be lubricated, by the closing of a check valve to prevent the further flow of emergency oil to the remaining engine components.

9 Claims, 2 Drawing Figures

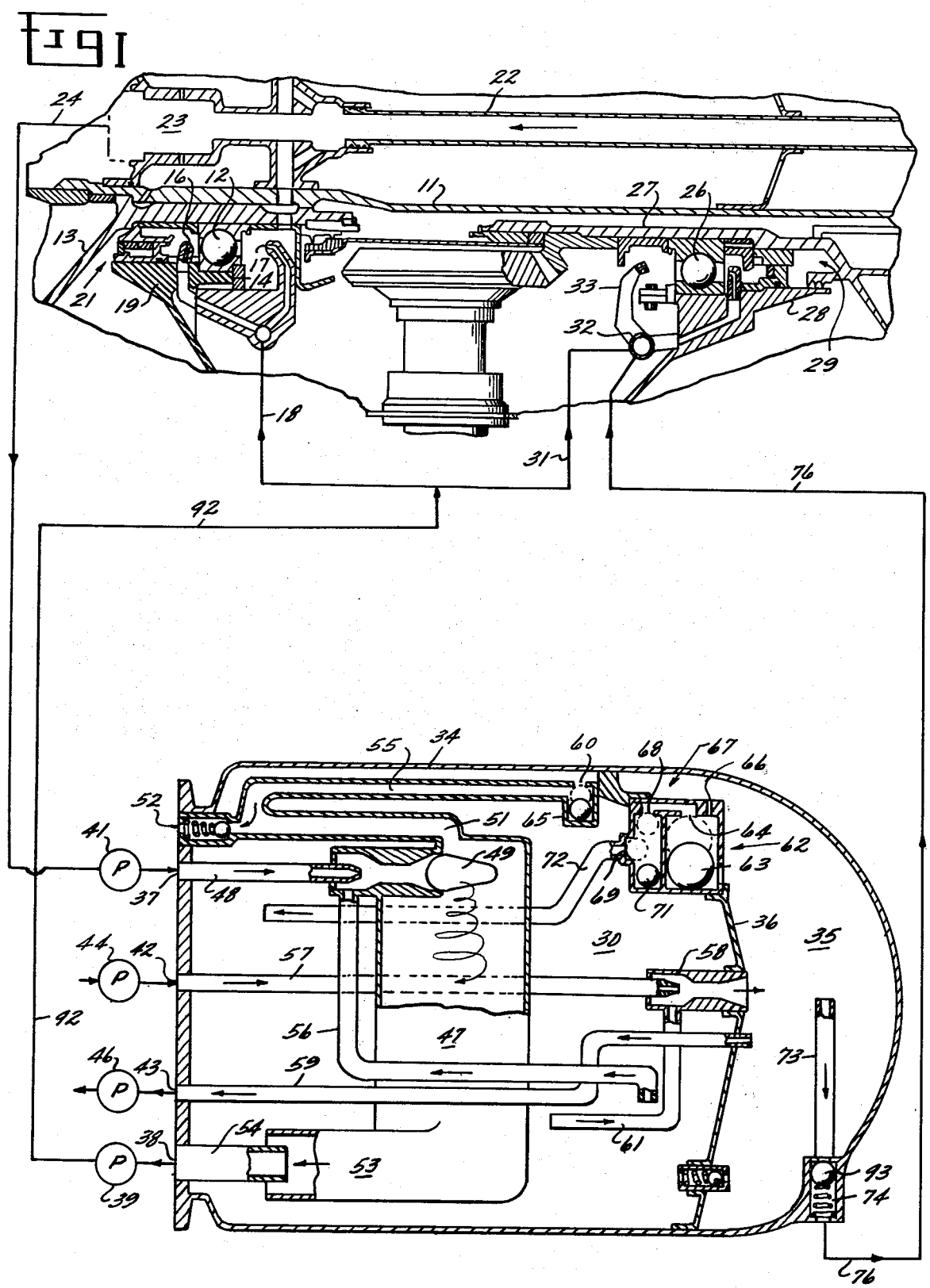

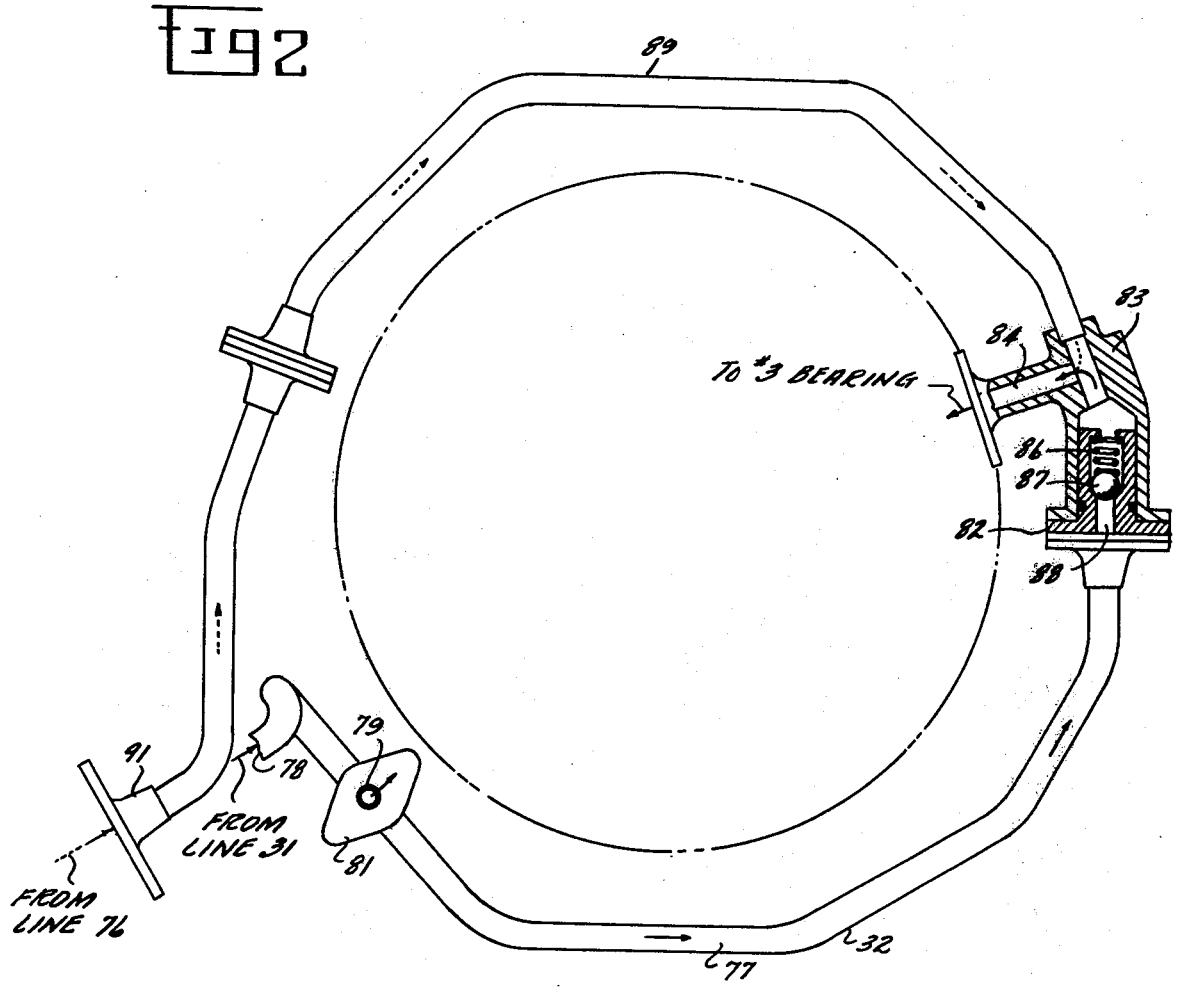

AUXILIARY OIL SUPPLY SYSTEM

The invention herein described was made in the course of or under a contract, or a subcontract thereunder, with the United States Department of the Air Force.

BACKGROUND OF THE INVENTION

This invention relates generally to lubrication systems and, more particularly, to emergency oil supply systems for gas turbine engines.

Typically, the high pressure and low pressure shafts of a gas turbine engine are supported by three main bearings each of which is cooled and lubricated by a constant flow of oil from a main supply system. Generally, oil is gravity fed from a main supply tank to the supply pump which then provides oil under pressure through a filter to the bearings. The oil which is sprayed on the bearings collects in sumps below and gravity drains into scavenge pumps which return the oil to the main supply tank.

Since the main oil pump is gravity fed from the oil tank, the oil supply to the pump can be disrupted to starve the pump whenever a maneuver of the aircraft causes a deviation of the engine from its normal upright position. For example, during inverted flight conditions, all of the oil flows to the ceiling of the oil tank and the main oil pump will supply air only. Another maneuver which disrupts the normal gravity feed procedure is when the aircraft is operating in a negative gravity condition. Again, the main lube pump will supply only air. Failure of the main lube supply pump or other components of the supply system can also disrupt the flow of oil to the bearings.

Some bearing applications are capable of withstanding such temporary oil interruptions without resultant overheating and failure. However, there are other bearings which are exposed to more extreme operating conditions and which cannot meet the requirements of withstanding such unavoidable lube oil interruptions. One of the parameters which relates to a bearing's ability to withstand short periods of dry operation is its so-called "DN value," which represents the bore size and associated shaft speed. For example, a bearing for a high-speed core rotor will have a higher DN value and will be less capable of running dry than will a low pressure turbine shaft which necessarily has a lower DN value. Another factor which may affect this ability is the heat transfer characteristics of the housing which surrounds the bearing. For example, while a housing made of titanium material is preferable for weight purposes, the poor heat transfer characteristics make is less desirable from the standpoint of retaining the bearing heat.

It is therefore an object of the present invention to provide a means by which a high speed core rotor shaft bearing can withstand periods of oil interruption.

Another object of the present invention is the provision in lubrication systems for supplying oil to a bearing during periods of negative-G operating conditions.

Yet another object of the present invention is the provision for augmenting a gravity feed lube oil system during periods of negative-G operating conditions and during periods in which the engine is operating in the inverted position.

Still another object of the present invention is to provide an emergency lube oil supply without significantly modifying the existing systems.

Still another object of the present invention is to provide an emergency lube oil system which is economical and effective in use.

These objects and other features and advantages become more readily apparent upon reference to the following description when taken in conjunction with the appended drawings.

SUMMARY OF THE INVENTION

Briefly, in accordance with one aspect of the invention, an auxiliary lube oil line is installed to provide fluid communication between an existing hydraulic tank and the bearing to be lubricated. A pump which is constantly making up oil to the hydraulic tank from the main lube tank tends to keep the hydraulic tank full and under pressure at all times including during periods of negative-G operation. Whenever there is an interruption of the oil flow from the main lube tank to the bearing, a valve in the auxiliary oil line is opened to provide oil to the bearing on a temporary emergency basis.

By another aspect of the invention, check valves are placed in the system on either side of the bearing to be lubricated, one in the line from the main lube tank and one from the line from the hydraulic tank. When the pressure in the main oil supply line is lost, the check valve in that line will close to prevent oil from flowing to the remaining engine components, while at the same time the pressure in the hydraulic tank will open the valve in the auxiliary line and allow the oil to flow to the bearing. If normal operation is subsequently restored, the sequence is reversed and the hydraulic tank will be replenished by the make-up system.

In the drawings as hereinafter described, the preferred embodiment is depicted; however, various other modifications and alternative constructions can be made thereto without departing from the true spirit and scope of the invention.

BRIEF DESCRIPTION OF THE DRAWINGS

FIG. 1 is a schematic illustration of the lube oil system incorporating the auxiliary oil supply system of the present invention.

FIG. 2 is an end view of the lubrication loop portion of the invention with a portion thereof being sectioned to illustrate internal parts thereof.

DESCRIPTION OF THE PREFERRED EMBODIMENT

Typically, an aircraft engine has three bearing support structures or frames, the front frame, the fan frame and the turbine frame, each of which contains one or more bearings for supporting the rotating system. Shown in FIG. 1 is the bearing structures and rotating elements which are associated with the fan frame portion of the engine which provides support for both the fan rotor and for the high pressure rotor. The low pressure rotor shaft 11 which is connected to the fan rotor at its forward end and the low pressure rotor at the aft end receives partial support from the No. 2 bearing 12, a ball thrust bearing which supports the rear of the fan rotor 13 and the front of the low pressure shaft 11 in the fan frame. The outer race of the No. 2 bearing 12 has an antirotation pin 14 to prevent rotation thereof and the inner race rotates with the fan rotor 13 at a relatively low speed as compared with the high pressure rotor shaft. Lubrication is provided to the No. 2 bearing by the forward and rear oil jets, 16 and 17, respectively, which receive lubrication oil along line 18 in a manner described hereinafter. A bearing housing 19 surrounds the No. 2 bearing 12 and an oil/air seal 21 prevents the leakage of oil around the rotating parts while the lubrication oil is returned by way of a sump to the lubrication oil pump. Oil from the rear sump is returned by way of scavenge line 22.

The No. 3 bearing 26 is a ball-thrust bearing located in the fan frame which provides support to the front of the high pressure rotor shaft 27 and carries the thrust load of the high pressure rotor. A bearing housing 28 surrounds the No. 3 bearing and oil/air seals 29 prevent lubrication oil from leaking around the rotating parts. Lubrication is provided to the No. 3 bearing by way of the line 31 from the main lube tank, a lubrication loop 32, a forward oil jet 33 and an aft jet (not shown). The oil is supplied directly to the bearing and drains by gravity from the sump into the gearbox where it then returns to the main oil tank in a manner to be described hereinafter.

Lubrication oil is supplied from a combination lubrication/hydraulic oil tank which is shown in the bottom of FIG. 1 and is of the type described in U.S. Pat. No. 3,612,083, issued on Oct. 12, 1971 and assigned to the assignee of the present invention. The tank comprises an outer shell or housing 34 having an internal wall member 36 which divides the housing into two compartments, a lube oil compartment 30 and a hydraulic oil compartment 35. The tank is formed with an inlet 37 and an outlet 38 for connection of compartment 30 with a fluid system such as an aircraft engine lubrication system having a lube supply pump 39 and a scavenge pump 41. In like manner, an inlet 42 and an outlet 43 are provided to connect compartment 35 with the fluid system of an aircraft engine hydraulic system having a hydraulic return pump 44 and a hydraulic supply pump 46. A de-aerator tank 47 provides for the separating of the air from the oil when it returns to the tank inlet 37. The oil comes into the conduit 48 and into a jet pump 49 where a high velocity vortical or cyclonic flow is induced. The resulting separated air is then vented through a port 51 to a tank outlet 52, and the de-aerated oil passes out the tangential outlet 53, the conduit or standpipe 54 to the outlet 38. It will be noted that the tangential outlet 53 telescopes over the standpipe 54 so that when the tank is disposed in a nose-down attitude, tangential velocity of the de-aerated oil effluxing from the tangential outlet 53 is sufficient to force the oil to the pump 39. The air space above the oil is suitably vented to the tank outlet 52 through a conduit 55 having a vent port 60 which is closable by gravity valve means 65.

In order to ensure that a sufficient quantity of oil is delivered to the pump 39 when the tank is disposed in the nose-down attitude, the discharge from the tangential outlet should preferably exceed the requirements of the pump 39. To this end, the jet pump 49 acts to pump oil from the compartment 30 into the de-aerator tank 47 through a lube make-up conduit 56 so as to maintain a sufficient supply of oil to the tangential outlet 53.

It will be recognized, however, that when the aircraft is in a negative-G situation or in an inverted position, the oil will not be in the bottoms of the sumps and will therefore not be picked up by the scavenge pumps 41. Accordingly, there will be no oil returned by way of the conduit 48 and therefore the pump 49 will not work to make up oil along the conduit 56. This is one of the operating conditions to which the present invention relates.

Referring now to the hydraulic compartment 35, an inlet conduit 57 carries oil from the inlet 42, through a jet pump 58 and into the compartment 35, and a feed conduit 59 carries hydraulic oil from the compartment 35 to the outlet 43. The jet pump 58 acts (under predetermined conditions of pressure) to automatically pump oil from the lubrication compartment 30 into the hydraulic compartment 35 by way of conduit 61 to maintain a predetermined level of fluid in the hydraulic compartment.

As part of the system which maintains a predetermined level of oil in the hydraulic compartment 35, a valve means 62 is provided to include a float 63 adapted to open and close a valve port 64 which communicates with the hydraulic compartment 35 by way of a passage 66 so as to vent the compartment 35 and establish a predetermined oil level within the compartment during normal level flight operation.

In operation, when the flow of the hydraulic fluid through conduit 59 exceeds the return flow through conduit 57, thereby reducing the fluid level and pressure level within the compartment 35, return fluid is pumped by way of conduit 61 through the jet pump 58 to the compartment 35. During this period the oil level in compartment 35 is at a reduced level so that the valve port 64 is open to allow a venting of the compartment 35. When the oil reaches the predetermined level at which the float 63 closes the port 64, the backpressure in the compartment 35 will be sufficient to prevent pumping action by the pump 58 and the volume of oil in the compartment 35 will remain constant until a demand is made of it from the feed conduit 59 at which time the float 63 will open the port and the process will be repeated. In this way, the hydraulic compartment 35 is maintained with a full supply of oil at all times.

In order to prevent inadvertent fluid exchange between the compartments 30 and 35 during nose-up and nose-down attitudes and during inverted flight or negative-G conditions, suitable gravity valve means 67 is provided to include an inlet valve port 68, an outlet valve port 69 in series flow communication with the valve port 64 and a suitable closure member 71 adapted to close port 68 during inverted flight or negative-G conditions and close port 69 when the tank is in the nose-up attitude. A suitable standpipe or conduit 72 extends from the valve port 69 to a position which would be above the oil level in compartment 30 when the tank is in the nose-down attitude so as to prevent fluid exchange during this condition.

Also communicating with the hydraulic compartment 35 is a standpipe 73 extending upwardly into the compartment 35 and having at its base a check valve 74 which leads to the auxiliary lubrication oil line 76 and to the oil loop 32. Referring now to FIG. 2, the oil loop 32 is shown to comprise a semicircular conduit 77 having an inlet end 78 and a first discharge port 79 with associated bracket 81. During normal operation, lube oil passes from the discharge port 79 to the gearbox and to the aft oil jets for the No. 3 bearing. Fluidly communicating with the other end of the conduit 77 is a check valve 82 which is installed in a receptacle 83 whose port 84 fluidly communicates with the No. 3 bearing as shown by the arrows. For purposes of description, the check valve shown is one having a spring 86 and associated ball 87 which engages a port 88 to close the valve 82 from flow in either direction during predetermined conditions. Leading into the other end of the receptacle 83 is another semicircular conduit 89 which fluidly connects to the receptacle port 84 from line 76 by way of the connector 91. This conduit 89 comes into use only during emergency periods when lubrication oil is not being supplied to the conduit 77 for one reason or another.

In operation, when there is a sufficient amount of oil in the lower part of the lubrication compartment 30, the lube supply pump 39 supplies oil to line 92 and hence to the lines 18 and 31 where it is in turn supplied to the Nos. 2 and 3 bearings, respectively. As the oil enters from line 31 to the semicircular conduit 77, the pressure pushes the ball 87 against the spring 86 and opens the port 88 to allow oil to flow through the port 84 to the No. 3 bearing. At the same time, oil flows into the conduit 89 and the auxiliary lubrication line 76 where it exerts pressure against the ball 93 of the check valve 74. In this way the check valve 74 prevents lube oil from entering the hydraulic compartment 35 by way of the line 76, and the pressure in the valve 74 prevents the hydraulic oil pressure in the compartment 35 from opening the check valve 74. If for any reason the oil supply to the pump 39 and hence to the semicircular conduit 77 is cut off, such as for example one of the reasons discussed hereinabove, then the check valve 82 closes and the pressure in the conduit 89 is relieved such that the check valve 74 is allowed to open by reason of the higher pressure in the hydraulic compartment 35. When this occurs, lubrication oil from a compartment 35 commences to flow into line 76, the conduit 89 and the port 84 to supply lubrication oil to the No. 3 bearing on a temporary basis. If oil pressure is subsequently restored in the conduit 77, the check valve 82 opens, the check valve 74 closes and the system is automatically restored to its normal operation. The hydraulic tank 35 will then be replenished by the make-up system described hereinabove.

It will be understood that while the present invention has been described in terms of a preferred embodiment, it may take on any number of other forms while remaining within the scope and intent of the invention. For example, it will be recognized that the valving system for controlling the flow in the auxiliary supply portion of the invention has been described in terms of two ball and spring-type check valves while there are a number of various types of systems which could adequately provide the function as contemplated. Further, although the lubrication oil tank has been described in some detail, it will be recognized that various other types and designs could just as well be adapted for use with the present invention.

Having thus described what is considered novel and desired to be secured by Letters Patent of the United States is:

1. An improved lubrication system of the type having a main oil supply tank and a main oil supply line for providing oil to at least one bearing which is sensitive to an occasional interruption of oil supply, wherein the improvement comprises:
    (a) a secondary oil supply tank which maintains a volume of oil under pressure;
    (b) a secondary oil supply line fluidly interconnecting said secondary oil supply tank and the bearing; and
    (c) a valve in said secondary oil supply line, said valve being fluidly connected to and responsive to low pressures in the main oil supply line to automatically open and provide for the flow of oil from said secondary oil supply tank to the bearing.

2. An improved lubrication system as set forth in claim 1 and including a check valve disposed in said main oil supply line.

3. An improved lubrication system as set forth in claim 1 wherein said secondary oil supply tank includes another oil supply line for carrying a flow from said secondary oil supply tank.

4. An improved lubrication system as set forth in claim 1 wherein said valve comprises a check valve which prevents the flow of oil into said secondary oil supply tank.

5. An improved lubrication system as set forth in claim 1 and including means for introducing the flow of oil into said secondary oil supply tank.

6. An improved lubrication system as set forth in claim 5 and including means for determining the level of oil in said secondary oil supply tank and means for maintaining a substantially constant volume of oil therein.

7. An improved method of lubricating a bearing during periods in which the oil supply from a main oil lube system is interrupted comprising the steps of:
    (a) providing an auxiliary oil tank which maintains a supply of oil under pressure;
    (b) providing an oil supply line from said auxiliary oil tank to the bearing; and
    (c) opening a valve in said oil supply line by reducing the pressure on the discharge side thereof during periods of oil interruption to provide an emergency supply of oil to the bearing.

8. An improved method of lubricating a bearing as set forth in claim 7, wherein a check valve is included between the main lube oil supply and the bearing, and there is a further step of closing said check valve to prevent the flow of oil toward the main lube oil supply.

9. An improved method of lubricating a bearing as set forth in claim 7 and including the step of closing said valve and replenishing the oil supply in said auxiliary tank.

* * * * *